(12) United States Patent
Park et al.

(10) Patent No.: US 11,585,333 B2
(45) Date of Patent: Feb. 21, 2023

(54) LINEAR COMPRESSOR

(71) Applicant: LG Electronics Inc., Seoul (KR)

(72) Inventors: Sanga Park, Seoul (KR); Hyosang Yu, Seoul (KR); Sangsub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 450 days.

(21) Appl. No.: 16/591,191

(22) Filed: Oct. 2, 2019

(65) Prior Publication Data

US 2020/0318622 A1 Oct. 8, 2020

(30) Foreign Application Priority Data

Apr. 3, 2019 (KR) .......... 10-2019-0039150

(51) Int. Cl.
| | |
|---|---|
| *F04B 35/04* | (2006.01) |
| *F04B 9/107* | (2006.01) |
| *F04B 39/12* | (2006.01) |

(52) U.S. Cl.
CPC .............. *F04B 35/04* (2013.01); *F04B 9/107* (2013.01); *F04B 35/045* (2013.01); *F04B 39/121* (2013.01)

(58) Field of Classification Search
CPC .......... F04B 35/04; F04B 35/045; F04B 9/02; F04B 9/025; F04B 17/04; F04B 17/042; F04B 39/00; F04B 39/0027; F04B 39/0044; F04B 53/00; F04B 53/001; F04B 53/14; F04B 53/144; F16F 3/04
USPC ................... 267/166, 168, 289, 290
See application file for complete search history.

(56) References Cited

U.S. PATENT DOCUMENTS

| | | | | | |
|---|---|---|---|---|---|
| 4,198,743 | A | * | 4/1980 | Stuber ............... | H02K 1/146 29/605 |
| 4,889,327 | A | * | 12/1989 | Seyler ............... | B21F 3/04 267/180 |
| 5,944,302 | A | * | 8/1999 | Loc ............... | F16F 3/04 267/180 |
| 6,435,842 | B2 | * | 8/2002 | Song ............... | F04B 35/045 267/109 |
| 2002/0158392 | A1 | * | 10/2002 | Petrina ............. | F16F 1/3665 267/168 |

(Continued)

FOREIGN PATENT DOCUMENTS

| | | |
|---|---|---|
| CN | 103629075 | 3/2014 |
| KR | 20090041706 | 4/2009 |

(Continued)

OTHER PUBLICATIONS

Korean Office Action in Korean Application No. 10-2019-0039150, dated Mar. 25, 2020, 12 pages (with English translation).

(Continued)

*Primary Examiner* — Charles G Freay
*Assistant Examiner* — Chirag Jariwala
(74) *Attorney, Agent, or Firm* — Fish & Richardson P.C.

(57) ABSTRACT

A linear compressor includes one spring assembly including a plurality of spring parts fixed to both side surfaces of a supporter and a rear cover and configured to support a load generated in the compressor. In addition, both side portions of the spring part are provided with fixing brackets coupled to the supporter and the rear cover, and the fixing bracket is provided with an insertion member or a bracket coupling member so that the coupling force of the spring part can be increased.

19 Claims, 11 Drawing Sheets

(56) References Cited

U.S. PATENT DOCUMENTS

| | | | | |
|---|---|---|---|---|
| 2004/0115076 | A1* | 6/2004 | Lilie | F04B 35/045 |
| | | | | 417/416 |
| 2004/0141860 | A1* | 7/2004 | Puff | F04B 35/045 |
| | | | | 417/417 |
| 2010/0242721 | A1* | 9/2010 | Kim | F04B 39/0044 |
| | | | | 92/261 |
| 2010/0320660 | A1* | 12/2010 | Takeda | F16F 1/125 |
| | | | | 267/179 |
| 2013/0121855 | A1* | 5/2013 | Lilie | F04B 53/004 |
| | | | | 417/363 |
| 2015/0337822 | A1* | 11/2015 | Lilie | F04B 39/121 |
| | | | | 92/132 |
| 2015/0369225 | A1* | 12/2015 | Ha | F04B 39/123 |
| | | | | 417/443 |
| 2017/0298913 | A1* | 10/2017 | Kim | F04B 35/045 |

FOREIGN PATENT DOCUMENTS

| | | | |
|---|---|---|---|
| KR | 20100092501 | 8/2010 | |
| KR | 20160011009 | 1/2016 | |
| KR | 20160024217 | 3/2016 | |
| KR | 1020170124899 | 11/2017 | |
| KR | 200485003 | 12/2017 | |
| WO | WO2018030779 | 2/2018 | |
| WO | WO-2018030779 A1 * | 2/2018 | F04B 27/08 |

OTHER PUBLICATIONS

Extended European Search Report in European Appln. No. 19206302.2, dated Jul. 2, 2020, 3 pages.

KR Office Action in Korean Appln. No. 10-2019-0039150, dated Oct. 19, 2020, 12 pages (with English translation).

* cited by examiner

LINEAR COMPRESSOR

CROSS-REFERENCE TO RELATED APPLICATIONS

The present application claims priority under 35 U.S.C. 119 and 35 U.S.C. 365 to Korean Patent Application No. 10-2019-0039150, filed on Apr. 3, 2019, which is hereby incorporated by reference in its entirety.

BACKGROUND

The present invention relates to a linear compressor.

In a reciprocating type compressor, a compression space for compressing working gas is formed between a piston and a cylinder, and the piston linearly reciprocates within the cylinder to compress refrigerant flowing into the compression space.

In recent years, among the reciprocating type compressors, in particular, the piston is directly connected to a driving motor which reciprocates linearly, so that the compression efficiency can be improved without mechanical loss occurring when the rotational motion of a motor is converted into linear motion, many linear compressors having simple structure are developed.

Generally, a linear compressor is configured to suction and compress refrigerant, and then discharge the refrigerant, while a piston is linearly reciprocated within a cylinder by a linear motor in a closed shell.

Related Art Korean Patent Laid-Open Publication No. 10-2016-0011009 (Jan. 29, 2016) discloses a linear compressor. Such a linear compressor of the related art has the following problems.

First, since the spring is provided in the space between a supporter and a stator cover and in the space between the supporter and a back cover, a plurality of springs have to be installed and thus there is a problem that the volume of the compressor due to the plurality of springs is increased.

Second, since both end portions of the plurality of springs have to be installed on the supporter, the stator cover, and the back cover, the fixing portions for fixing the plurality of springs are increased and complicated. Therefore, there is a problem that the possibility that the fixed portion of the spring of the compressor between the driving is broken or separated becomes higher.

SUMMARY

The present invention has been made in order to solve the above problems and an objective of the present invention is to provide a linear compressor capable of high-speed operation by supporting a repeated load of a movable portion by using a spring assembly composed of a plurality of spring parts.

In addition, an objective of the present invention is to provide a linear compressor capable of preventing the spring parts from being broken or separated in a process of the reciprocating motion of the movable part by fixing both side portions of the plurality of spring parts to the outer surfaces of the supporter and the rear cover.

In addition, an objective of the present invention is to provide a linear compressor capable of fixing in an axial direction and a radial direction of the supporter and the rear cover to easily support an axial force and a side force occurring between the driving of the compressor.

In addition, an objective of the present invention is to provide a miniaturized linear compressor which reduces the volume of the spring assembly and thus reduce the size of a shell of the compressor by disposing one spring assembly composed of the plurality of spring parts between the supporter and the rear cover.

The linear compressor according to an embodiment of the present invention includes one spring assembly composed of a plurality of spring parts and the one spring assembly is fixed to both side surfaces of a supporter and a rear cover and can easily support a load generated in the compressor.

In addition, both side portions of the spring part are provided with fixing brackets coupled to the supporter and the rear cover, and the fixing bracket is provided with an insertion member or a bracket coupling member so that the coupling force of the spring part can be increased.

In particular, the insertion member is provided so as to be capable of being in contact with the spring part, so that the spring part can be prevented from moving in a lateral direction or a radial direction.

In addition, since the bracket coupling member is coupled to the two ribs forming the insertion portion of the spring part, the spring part can be tightened in a state of being inserted into the fixing bracket.

The linear compressor according to an embodiment of the present invention includes a supporter for supporting a piston reciprocating in a frontward and rearward direction; a rear cover spaced apart from the supporter; and a spring assembly disposed between the supporter and the rear cover and thus the supporter and the rear cover can be elastically supported.

The spring assembly may include a plurality of spring parts each having a first side portion supported by the supporter and a second side portion supported by the rear cover, and can be supported at a plurality of points of the supporter and the rear cover.

The spring assembly may further include a fixing bracket which forms a spring insertion portion into which the first side portion or the second side portion is inserted and coupled to the supporter and the rear cover.

The fixing bracket may include a first fixing bracket configured to support the first side portions of the plurality of spring parts, the first bracket being configured to be coupled to the supporter; and a second fixing bracket configured to support the second side portions of the plurality of spring parts, the second fixing bracket being configured to be coupled to the rear cover.

The fixing bracket may include a bracket main body on which the spring insertion portion is formed; and a body coupling portion which is provided on both sides of the bracket main body and to which a coupling member is fastened.

The coupling member may include a first coupling member which is fastened to the supporter and the body coupling portion; and a second coupling member which is fastened to the rear cover and the body coupling portion.

The linear compressor may further include an insertion hole which is formed on the bracket main body; and an insertion member which is inserted into the insertion hole and is in contact with the first side portion or the second side portion of the spring part.

The insertion hole may include a first insertion hole which is formed to be recessed in an axial direction of the bracket main body and communicates with the spring insertion portion.

A first direction in which the spring insertion portion is recessed from an outer surface of the bracket main body may intersect with a second direction in which the first insertion hole is recessed from the outer surface of the bracket main body.

The insertion hole includes a plurality of the first insertion holes.

The insertion member may include a first insertion member inserted into the first insertion hole, and the first insertion member may extend in a normal direction of the spring part inserted into the spring insertion portion.

The plurality of insertion holes may further include a second insertion hole which is recessed from the bracket main body in a radial direction and communicates with the spring insertion portion, and a third direction in which the second insertion hole is recessed from the outer surface of the bracket main body may intersect with the first direction and the second direction, respectively.

The insertion member may include a second insertion member which is inserted into the second insertion hole, and the second insertion member may extend in a normal direction of the spring part inserted into the spring insertion portion.

The plurality of spring parts may include a first spring part, a second spring part, and a third spring part which are respectively supported at three points on the supporter and the rear cover.

The bracket main body may include first and second ribs extending from the spring insertion portion and spaced apart from each other; and a bracket coupling member configured to be fastened to the first and second ribs.

The supporter may include a plate-shaped supporter main body and a supporter recessed portion which is recessed from an outer surface of the supporter main body, and the bracket main body may further include a support part located in the supporter recessed portion.

The support part, the spring insertion portion, and the first and second ribs may be aligned in the axial direction.

According to the above configuration, the linear compressor can be operated at a high speed by supporting the repeated loads of the movable portion by using the spring assembly composed of a plurality of spring parts.

In addition, by fixing both side portions of the plurality of spring parts to the outer surfaces of the supporter and the rear cover, it is possible to prevent breakage or separation of the spring parts in a process of reciprocating motion of the movable part.

In addition, the spring assembly can be fixed in the axial direction and the radial direction of the supporter and the rear cover to easily support an axial force and a side force occurring between the driving of the compressor.

In addition, since one spring assembly composed of the plurality of spring parts is disposed between the supporter and the rear cover, the volume of the spring assembly can be reduced, and accordingly, the size of the shell of the compressor can be reduced to realize miniaturization of the linear compressor.

DETAILED DESCRIPTION OF THE EMBODIMENTS

Figure 1:
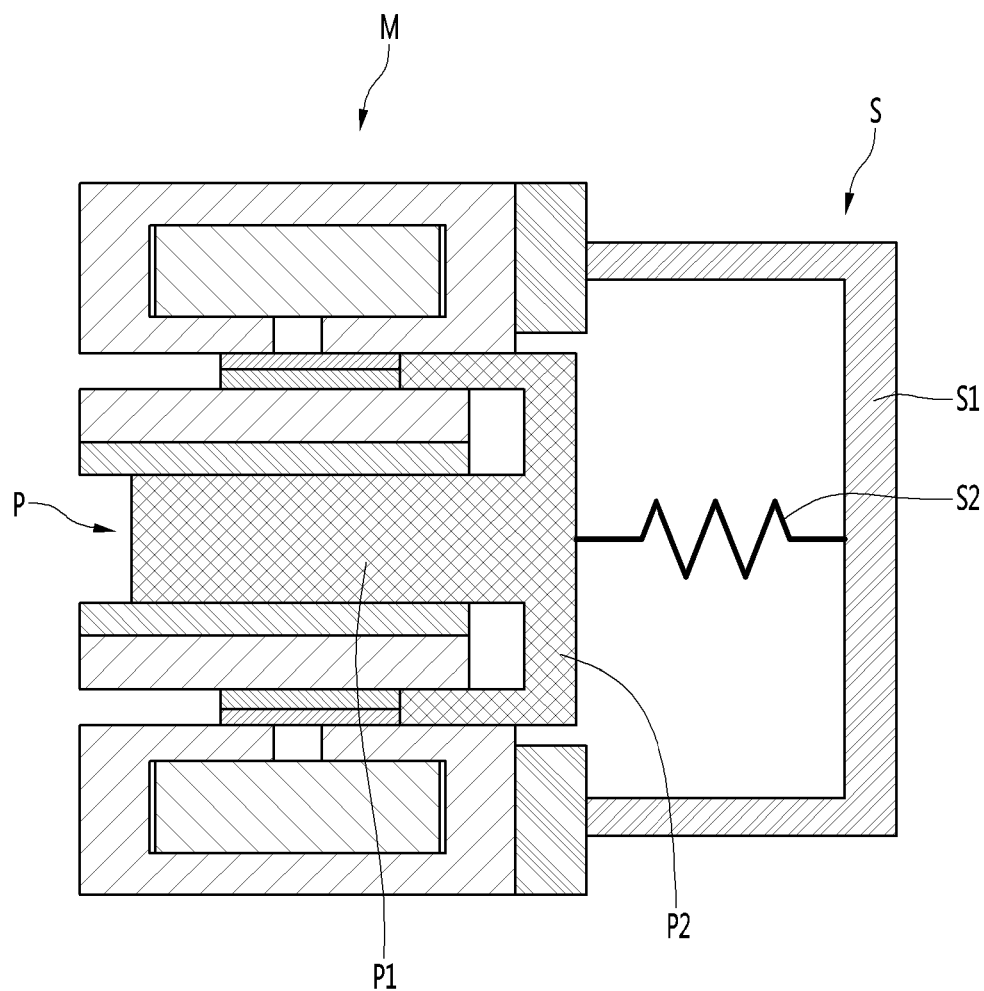
FIG. 1 is a conceptual diagram illustrating a linear compressor according to an embodiment of the present invention.

Hereinafter, some embodiments of the present invention will be described in detail with reference to exemplary drawings. It should be noted that, in adding reference numerals to the constituent elements of the drawings, the same constituent elements are denoted by the same reference symbols as possible even if they are illustrated in different drawings. In addition, in the description of the embodiments of the present invention, the detailed description of related known configurations or functions will be omitted in a case where it is determined that a detailed description of related known configurations or functions hinders understanding of the embodiments of the present invention.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is a conceptual diagram illustrating a linear compressor according to an embodiment of the present invention.

Referring to FIG. 1, the linear compressor 10 according to an embodiment of the present invention includes a motor M for generating a driving force, a piston P1 coupled to the motor M and reciprocating in a frontward and rearward direction, a movable portion P having a supporter P2 to be coupled to the piston P1, and a support portion S for supporting the movable portion P. The support portion S may be supported in a shell of the compressor.

The support portion S includes a rear cover S1 forming a support main body and a spring S2 provided between the piston P1 and the rear cover S1. The spring S2 supports a reciprocating piston P1 in the axial direction and can be configured to limit movement of the piston P1 in the lateral direction (the radial direction).

At both side portions of the spring S2, the fixing portion to be coupled to the rear cover S1 and the supporter P2 may be provided. In order to prevent the spring S2 from being separated from the rear cover S1 and the supporter P2 in a process in which the piston P1 reciprocates in the axial direction, the fixing portion of the spring S2 has to be firmly coupled to the rear cover S1 and the supporter P2. In this embodiment, the fixing structure with respect to the rear cover S1 of the spring S2 and the supporter P2 is proposed.

Figure 2:
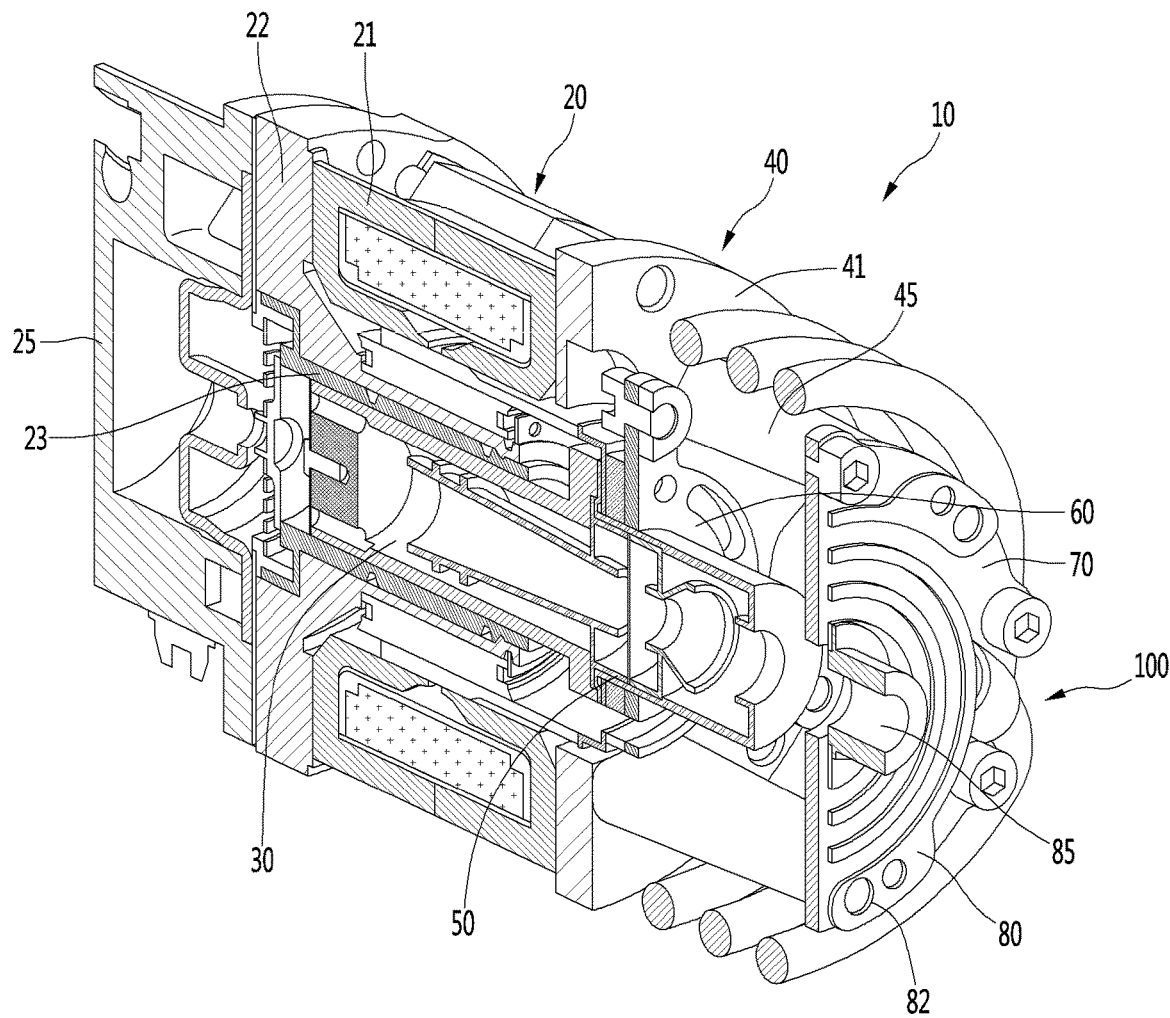
FIG. 2 is a sectional view illustrating a linear compressor according to a first embodiment of the present invention.

FIG. 2 is a sectional view illustrating a linear compressor according to a first embodiment of the present invention.

Referring to FIG. 2, the linear compressor 10 according to the first embodiment of the present invention includes a compressor main body provided inside a shell (not illustrated).

The compressor main body includes a frame 22, a cylinder 23 inserted into the frame 22 and having a compression space C, a piston 30 linearly reciprocating in the cylinder 23, and a motor 20 for applying a driving force to the piston 30. The motor 20 may include a linear motor which linearly reciprocates the piston 30 in an axial direction. The motor 20 has a hollow cylindrical shape, and the cylinder 23 can be inserted into the motor 20.

The linear compressor 10 further includes a suction muffler 50. The suction muffler 50 is coupled to the piston 30 and suctioned into the inside of the shell so that the refrigerant passing through the shell bracket 85 can flow there-into. A portion of the suction muffler 50 is located within the piston 30. In a process in which the refrigerant passes through the suction muffler 50, the flow noise thereof is reduced and the refrigerant passing through the suction muffler 50 can flow into the piston 30.

The directions are defined. The "axial direction" is a direction in which the piston 130 reciprocates and, among the axial direction, a direction from the suction muffler 50 toward the compression space C, that is, a direction in which the refrigerant flows, is referred to as "frontward direction"; and the opposite direction thereto is defined as "rearward direction". When the piston 130 moves in the frontward direction, the compression space C can be compressed. The direction perpendicular to the "axial direction" can be defined as "radial direction".

Meanwhile, a discharge cover 25 may be provided in front of the compression space P to form a discharge space for the refrigerant discharged from the compression space P.

The linear compressor 10 further includes a stator cover 40 coupled to the front of the motor 20. The stator cover 40 is provided with a cover body 41 having an opening through which the piston 30 can pass and at least one cover leg 45 extending from the cover body 41 toward the rear cover 70. A plurality of the cover legs 45 are disposed in a circumferential direction and can be fastened to the rear cover 70.

The linear compressor 10 further includes a supporter 60 for supporting a rear end portion of the piston 30. The supporter 60 is coupled to the rear side of the piston 30 and may have a supporter opening 62 (see FIG. 3) through which the suction muffler 50 passes.

The linear compressor 10 further includes a substantially disc-like rear cover 70. To the rear cover 70, a body support devices 80 and 85 for supporting the rear portion of the compressor main body to the shell may be coupled. In detail, the main body support devices 80 and 85 include a support spring 80 formed of a circular leaf spring and a shell bracket 85 coupled to a central portion of the support spring 80.

A cover hole 82 through which the fastening member fastened to the rear cover 70 passes is formed on the support spring 80. A plurality of the cover holes 82 may be formed on the peripheral portion of the support spring.

The shell bracket 85 is coupled to the shell, and the refrigerant suctioned into the shell can flow into a side of the suction muffler 50 through the inner space of the shell bracket 85.

The linear compressor 10 further includes a spring assembly 100 coupled to the supporter 60 and the rear cover 70 to support the piston 30. The spring assembly 100 is firmly fixed to the supporter 60 and the rear cover 70 so that tension or compression deformation can be performed.

The supporter 60 reciprocates together with the piston 30 and the rear cover 70 is a fixed component for supporting the piston 30 and the supporter 60, and in a process of the high-speed operation of the linear compressor 10, the spring assembly 100 has to be prevented from separating from the rear cover 70 or the supporter 60. Hereinafter, the configuration of the spring assembly 100 will be described.

Figure 3:
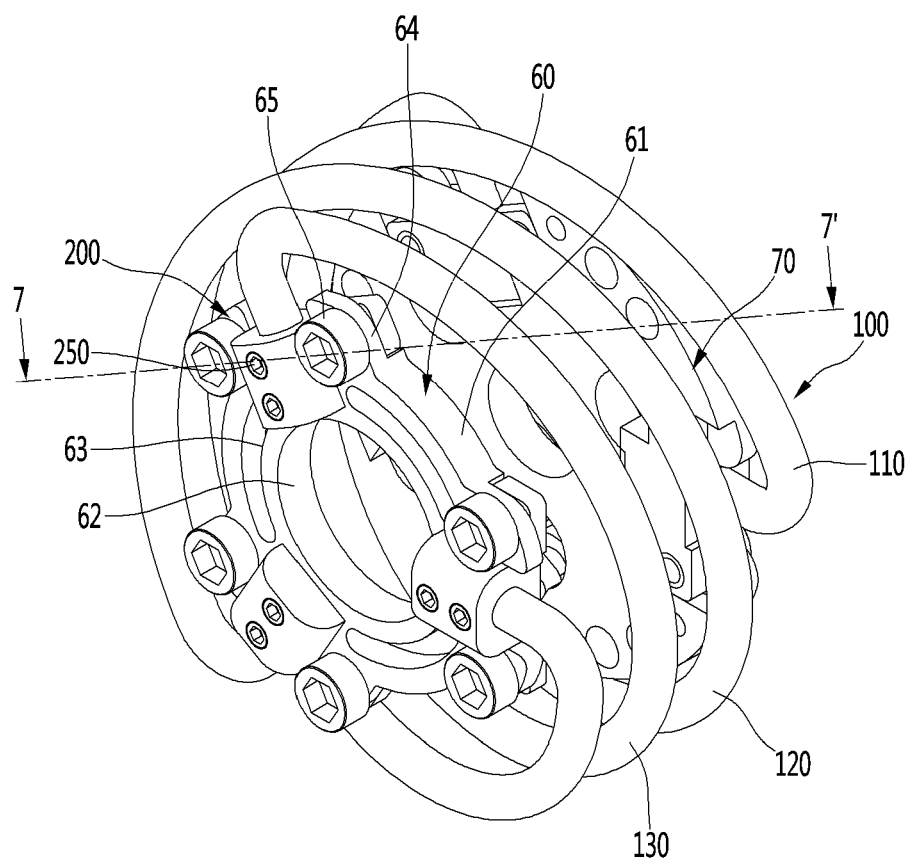
FIG. 3 is a perspective view illustrating a state where the spring assembly according to the first embodiment of the present invention is coupled to a supporter and a rear cover.
Figure 4:
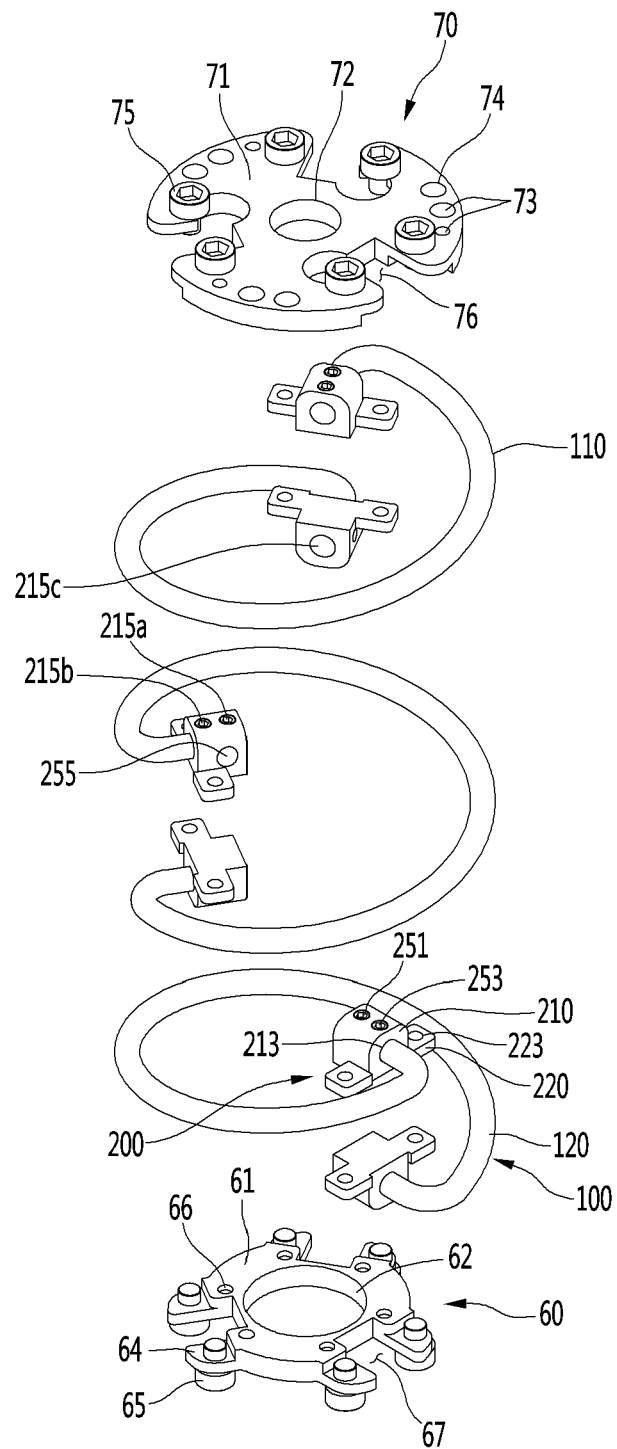
FIG. 4 is an exploded perspective view illustrating a spring assembly, a supporter, and a rear cover according to a first embodiment of the present invention.
Figure 5:
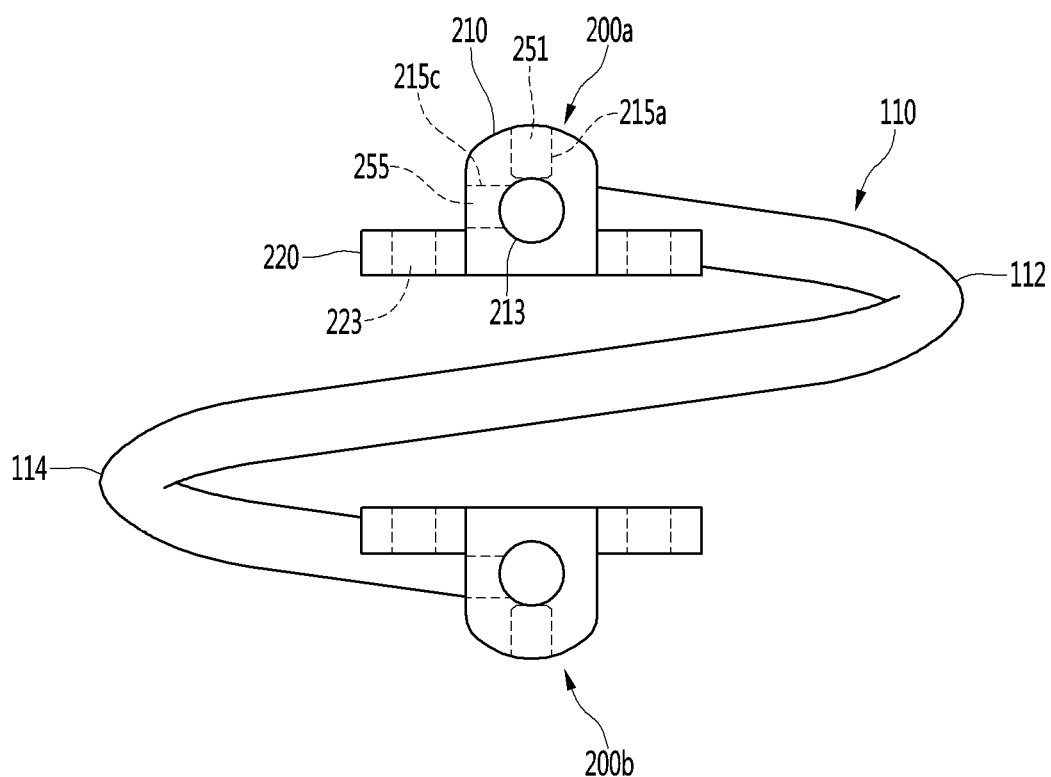
FIG. 5 is a front view illustrating a configuration of a spring part and a fixing bracket constituting the spring assembly according to the first embodiment of the present invention.
Figure 6:
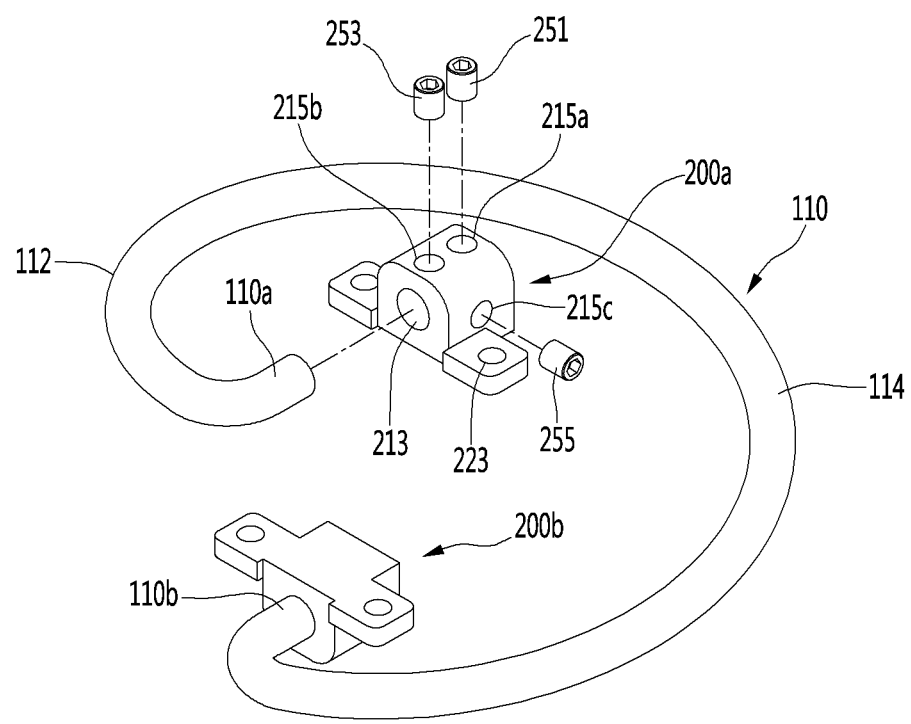
FIG. 6 is an exploded perspective view illustrating the spring part and the fixing bracket.

FIG. 3 is a perspective view illustrating a state where the spring assembly according to the first embodiment of the present invention is coupled to a supporter and a rear cover, FIG. 4 is an exploded perspective view illustrating a spring assembly, a supporter, and a rear cover according to a first embodiment of the present invention, FIG. 5 is a front view illustrating a configuration of a spring part and a fixing bracket constituting the spring assembly according to the first embodiment of the present invention, and FIG. 6 is an exploded perspective view illustrating the spring part and the fixing bracket.

Referring to FIGS. 3 to 6, the spring assembly 100 according to the first embodiment of the present invention may be configured to elastically support the reciprocating piston 30 by connecting the supporter 60 and the rear cover 70.

The spring assembly 100 includes a plurality of spring parts 110, 120, and 130. The plurality of spring parts 110, 120, and 130 may be coupled to the supporter 60 and the rear cover 70, respectively. It can be understood that the plurality of spring parts 110, 120, and 130 constitute a spring strand of the coil spring so that one coil spring can be formed when the plurality of spring parts 110, 120, and 130 are combined.

One side portion of the plurality of spring parts 110, 120, and 130 may be coupled in the circumferential direction of the supporter 60 and the other side portion thereof may be coupled in the circumferential direction of the rear cover 70.

For example, the plurality of spring parts 110, 120, and 130 may include three spring parts, and the three spring parts may be coupled to three portions of the supporter 60 and three portions of the rear cover 70. In other words, the spring assembly 100 can be supported at three points on the supporter 60 and the rear cover 70.

The plurality of spring parts 110, 120, and 130 include the first spring part 110, the second spring part 120, and the third spring part 130. The first to third spring parts 110, 120, and 130 may be configured to have a shape bent at least twice.

For example, the first spring part 110 includes a first bending portion 112 (see FIG. 5) and a second bending portion 114 which realize a twisted shape of the coil spring. The first spring part 110 can constitute a portion of one coil spring while connecting the supporter 60 and the rear cover 70 spaced apart in the frontward and rearward direction by the first and second bending portions 112 and 114.

The supporter 60 includes a supporter body 61 having a substantial disc shape and a bracket coupling portion 64 which extends from the supporter body 61 in the radial direction and to which the fixing bracket 200 is coupled. The fixing bracket 200 may be fastened to the bracket coupling portion 64 by a first coupling member 65. The first coupling member 65 may include a screw or a rivet.

A plurality of bracket coupling portions 64 are provided and the plurality of bracket coupling portions 64 may be disposed in a circumferential direction. For example, six bracket coupling portions 64 may be provided, and a supporter recessed portion 67 in which the bracket main body 210 of the fixing bracket 200 is located can be formed between the two bracket coupling portions 64. Therefore, three supporter recessed portions 67 are formed, and three bracket main bodies 210 can be located on the three supporter recessed portions 67.

A supporter opening 62 into which the suction muffler 50 is inserted is formed on the supporter body 61. For example, the supporter opening 62 may be formed in a circular shape at the central portion of the supporter body 61.

The supporter body 61 is formed with a supporter groove 63 recessed rearward from the front surface of the supporter body 61. The supporter grooves 63 may be rounded in the circumferential direction of the supporter body 61. A plurality of the supporter grooves 63 may be formed, and the plurality of supporter grooves 63 may be spaced apart from each other and arranged in the circumferential direction.

The supporter body 61 is formed with a piston fastening hole 66 through which a fastening member fastened to the piston 30 passes. A plurality of the piston fastening holes 66 may be formed, and the plurality of piston fastening holes 66 may be spaced apart in the circumferential direction.

The rear cover 70 includes a cover body 71 having a substantial disc shape and forming a cover opening 72. The cover opening 72 is formed in a substantially central portion of the cover body 71, and the shell bracket 85 may be configured to be coupled.

The cover body 71 is formed with a spring hole 73 to be coupled with the cover hole 82 of the support spring 80. The spring holes 73 may have a shape corresponding to the cover holes 82 and a plurality of spring holes 73 may be arranged in the circumferential direction of the cover body 71. The fastening member may pass through the cover hole 82 and be fastened to the spring hole 73.

The cover body 71 is formed with a leg hole 74 to be coupled with the cover leg 45 of the stator cover 40. The leg hole 74 may be disposed at a side of the spring hole 73 in the circumferential direction.

The rear cover 70 is provided with a cover recessed portion 76 which is recessed from the outer circumferential surface of the cover body 71 in the radial direction. The bracket main body 210 of the fixing bracket 200 may be positioned on the cover recessed portion 76. For example, three cover recessed portions 76 may be spaced apart in the circumferential direction. Three bracket main bodies 210 may be located on the three cover recessed portions 76.

A second coupling member 75 may be fastened to the cover body 71. The second coupling member 75 may be coupled to the fixing bracket 200 through the cover body 71. The plurality of second coupling members 75 are arranged in the circumferential direction of the cover body 71 and can be coupled with the body coupling portions 220 of the fixing brackets 200. The second coupling member 75 may include a screw or a rivet.

For example, six second coupling members 75 may be provided, and two second coupling members 75 may be coupled to the body coupling portion 220 in a pair. Accordingly, three fixing brackets 200 can be coupled to the cover body 71. The two second coupling members 75 forming a pair can be disposed on both sides of the cover recessed portion 76.

The spring assembly 100 includes three spring parts 110, 120, and 130 and a fixing bracket 200 provided on both side portions of the three spring parts 110, 120, and 130.

The fixing bracket 200 includes a first fixing bracket 200a (see FIGS. 5 and 6) provided on the first side portion 100a of the three spring parts 110, 120, and 130 and coupled to the supporter 60, and a second fixing bracket 200b (see FIGS. 5 and 6) provided on the second side portion 100b of the three spring parts 110, 120, and 130 and coupled to the rear cover 70. The first and second fixing brackets 200a and 200b may have the same configuration.

Specifically, the fixing bracket 200 includes a bracket main body 210 into which the spring parts 110, 120, and 130 are inserted and body coupling portions 220 which is provided on both sides of the bracket main body 210 and coupled to the supporter body 61 and the cover body 71.

The bracket main body 210 is formed with a spring insertion portion 213 into which one side portion of the spring parts 110, 120, and 130 is inserted. The spring insertion portion 213 includes a groove or a hole formed to be recessed from one surface of the bracket main body 210 in the radial direction.

The bracket main body 210 is formed with a plurality of insertion holes 215a, 215b, and 215c into which the insertion members 251, 253, and 255 are inserted. The insertion members 251, 253, and 255 may be provided so as to be capable of being in contact with the spring parts 110, 120, and 130 inserted into the spring insertion portion 213.

In detail, the plurality of insertion holes 215a, 215b, and 215c include first insertion holes 215a and 215b which are formed to be recessed in the axial direction of the bracket main body 210. The first insertion holes 215a and 215b may be configured to communicate with the spring insertion portion 213. A plurality of first insertion holes 215a and 215b, for example, two first insertion holes may be formed.

The first direction in which the spring insertion portion 213 is recessed from the outer surface of the bracket main body 210 can intersect with a second direction in which the first insertion holes 215a and 215b are recessed from the outer surface of the bracket main body 210. For example, the first and second directions may be perpendicular to each other.

The insertion members 251, 253, and 255 include first insertion members 251 and 253 inserted into the first insertion holes 215a and 215b. The first insertion members 251 and 253 may be, for example, columnar pieces. In addition, a plurality of first insertion members 251 and 253, for example, two first insertion members may be provided.

The first insertion members 251 and 253 extend in a normal direction of the spring part inserted into the spring insertion portion 213 and can be in contact with the surface of the spring part. For example, the first insertion members 251 and 253 can press the spring parts.

The plurality of insertion holes 215a, 215b, and 215c includes a second insertion hole 215c formed to be recessed from the bracket main body 210 in the radial direction. The second insertion hole 215c may be configured to communicate with the spring insertion portion 213.

The third direction in which the second insertion hole 215c is recessed from the outer surface of the bracket main body 210 may intersect with the first direction in which the spring insertion portion 213 is recessed from the outer surface of the bracket main body 210.

In addition, the third direction in which the second insertion hole 215c is recessed from the outer surface of the bracket main body 210 may intersect with the second direction in which the first insertion holes 215a and 215b are recessed from the outer surface of the bracket main body 210. For example, the third direction may be perpendicular to the first and second directions.

The insertion members 251, 253, and 255 include second insertion members 255 inserted into the second insertion holes 215c. The second insertion member 255 may be formed as a columnar piece, for example.

The second insertion member 255 extends in the normal direction of the spring part inserted into the spring insertion part 213 and can be in contact with the surface of the spring part. For example, the second insertion member 255 can press the spring part.

According to this configuration, one point of the outer surface of the spring part inserted into the spring insertion portion 213 can be in contact with and be pressed by the first insertion members 251 and 253 and the other point thereof can be in contact with and be pressed by the second insertion member 255. Therefore, in the driving process of the linear compressor 10, even if a load acts on the spring assembly 100 in an axial direction or a radial direction, the first to third spring parts 110, 120, and 130 can be maintained in a state of being stably fixed in the fixing bracket 200.

The body coupling portion 220 is provided on both sides of the bracket main body 210 and may have a fastening hole 223 into which the first coupling member 65 or the second coupling member 75 can be inserted.

The body coupling portion 220 provided on the first fixing bracket 200a is coupled to the supporter body 61 of the supporter 60 and the body coupling portion 220 provided on the second fixing bracket 200b can be coupled to the cover body 71 of the rear cover 70.

Figure 7:
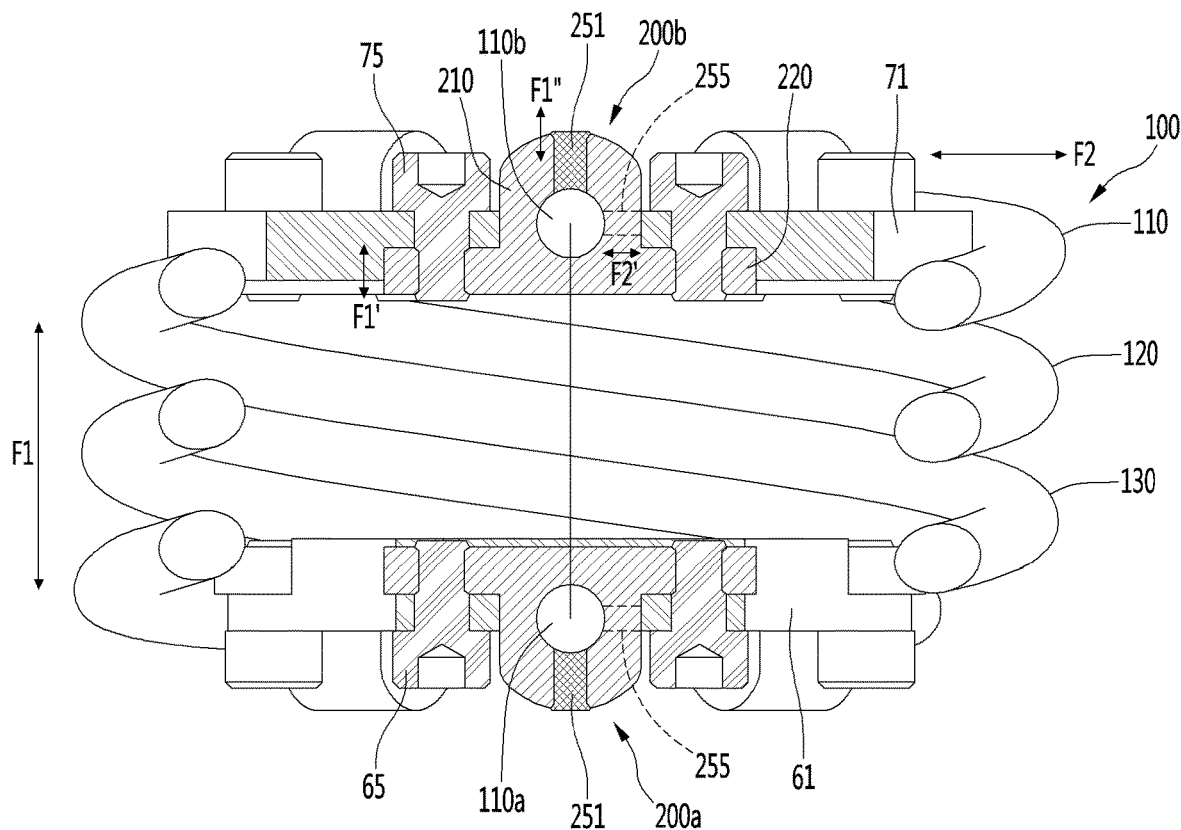
FIG. 7 is a sectional view taken along line 7-7' of FIG. 3.

FIG. 7 is a sectional view taken along line 7-7' of FIG. 3.

Referring to FIG. 7, the spring assembly 100 according to the first embodiment of the present invention is provided between the supporter 60 and the rear cover 70 and can elastically support the reciprocating movable portion P (see FIG. 1).

The spring assembly 100 includes the first to third spring parts 110, 120, and 130 which are coupled to a plurality of points of the supporter 60 and the rear cover 70 to form a single coil spring. For example, the plurality of points form three points, and the spring assembly 100 can support the supporter 60 and the rear cover 70 by three points by means of the first to third spring parts 110, 120, and 130. The three points may form a central angle of 120 degrees at equidistant intervals based on the center of the supporter 60 and the rear cover 70.

The first side portion 110a which are provided to each of the first to third spring parts 110, 120, and 130 may be inserted into the first fixing bracket 200a and the first fixing bracket 200a may be coupled to the supporter 60. The first and second insertion members 251, 253, and 255 provided on the first fixing bracket 200a may support the first to third spring parts 110, 120, and 130 by being in contact with the first side portion 110a.

The second side portion 110b of each of the first to third spring parts 110, 120, and 130 may be inserted into the second fixing bracket 200b and the second fixing bracket 200b may be coupled to the rear cover 70. The first and second insertion members 251, 253, and 255 provided on the second fixing bracket 200b can support the first to third spring parts 110, 120, and 130 by being in contact with the second side portion 110b.

In a process of operating the linear compressor 10, a load F1 in the axial direction acts on the spring assembly 100 to cause tensile or compressive deformation in the axial direction. At this time, since the first and second fixing brackets 200a and 200b are in a state of being axially fixed to the supporter 60 and the rear cover 70 by the first and second coupling members 65 and 75, respectively, the load F1 may be canceled by the fixing force F1' of the first and second coupling members 65 and 75.

In addition, since the first insertion members 251 and 253 inserted in the first and second fixing brackets 200a and 200b in the axial direction are in contact with the first and second side portions 110a and 110b to form a supporting force F1', it is possible to prevent axial deformation or breakage of the first and second side portions 110a and 110b due to the load F1.

Meanwhile, in a process of operating the linear compressor 10, the spring assembly 100 may be deformed laterally by a load in the radial direction, that is, a lateral force F2 acting. At this time, since the second insertion member 255 inserted into the first and second fixing brackets 200a and 200b in the radial direction is in contact with the first and second side portions 110a and 110b to form a supporting force F2', the radial deformation or breakage of the first and second side portions 110a and 110b by the load F2 can be prevented.

Hereinafter, a second embodiment of the present invention will be described. Since the present embodiment differs from the first embodiment in the configuration of the fixing bracket, differences will be mainly described, and the description and the reference numerals of the first embodiment are used for the same portions as those in the first embodiment.

Figure 8:
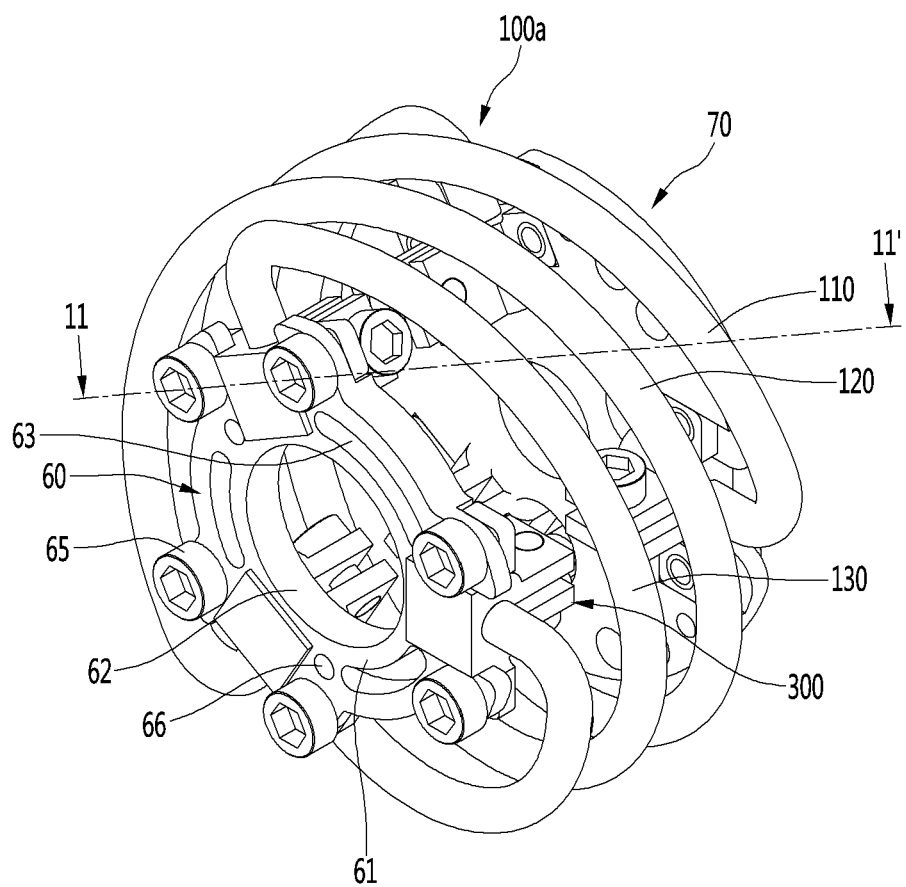
FIG. 8 is a perspective view illustrating a state where a spring assembly according to a second embodiment of the present invention is coupled to a supporter and a rear cover.
Figure 9:
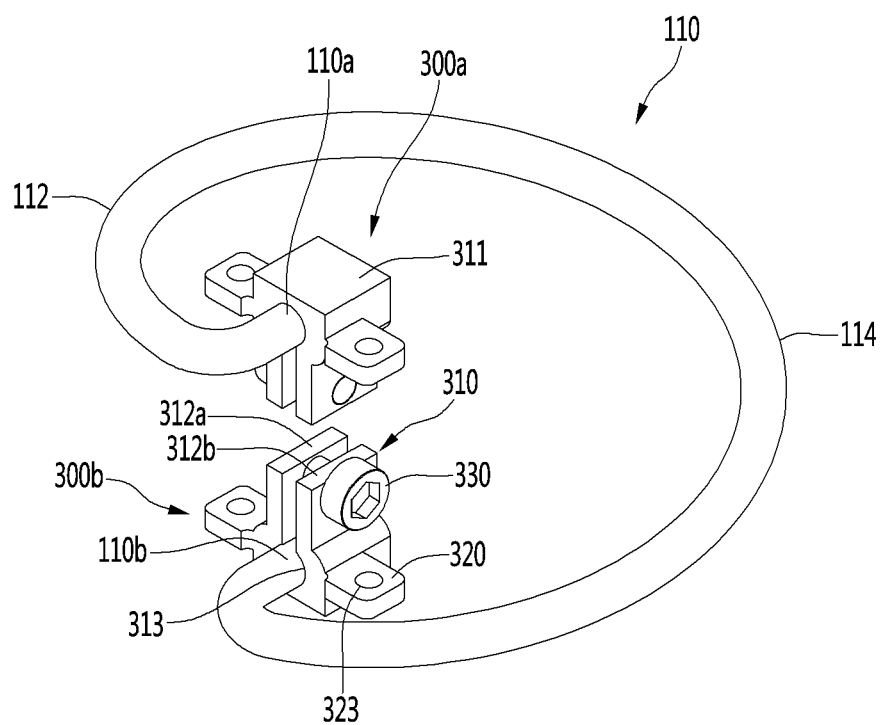
FIG. 9 is a perspective view illustrating a configuration of a spring part and a fixing bracket constituting a spring assembly according to a second embodiment of the present invention.
Figure 10:
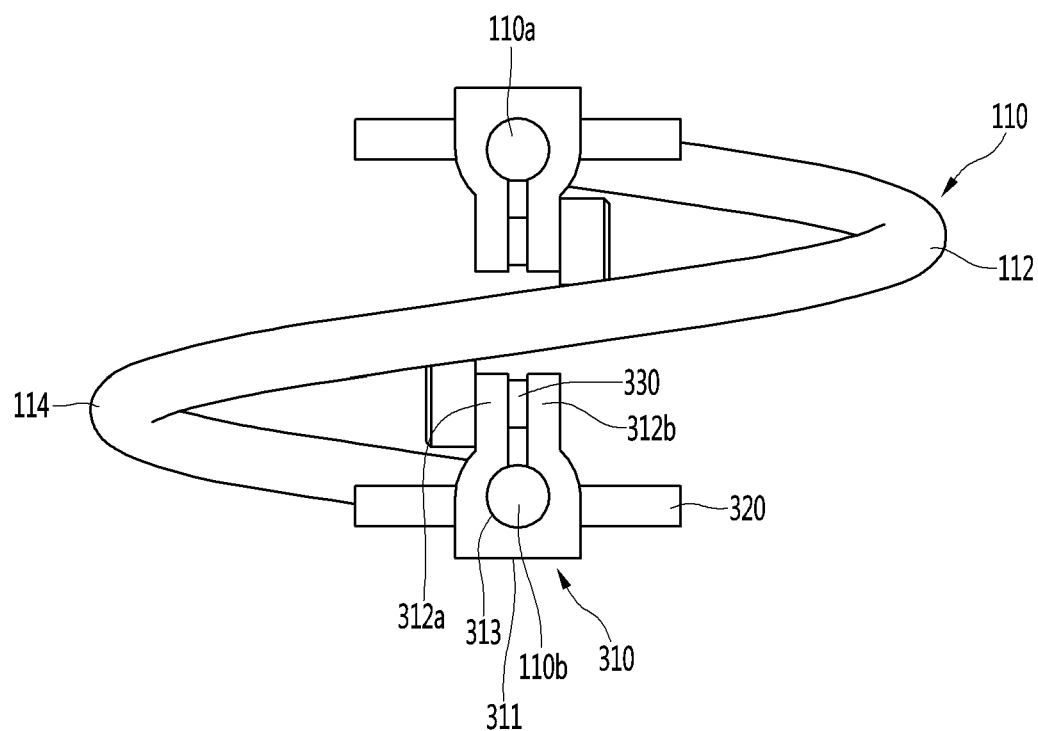
FIG. 10 is a front view illustrating a configuration of a spring part and a fixing bracket constituting a spring assembly according to a second embodiment of the present invention.

FIG. 8 is a perspective view illustrating a state where a spring assembly according to a second embodiment of the present invention is coupled to a supporter and a rear cover, FIG. 9 is a perspective view illustrating a configuration of a spring part and a fixing bracket constituting a spring assembly according to a second embodiment of the present invention, and FIG. 10 is a front view illustrating a configuration of a spring part and a fixing bracket constituting a spring assembly according to a second embodiment of the present invention.

Referring to FIGS. 8 to 10, the spring assembly 100a according to the second embodiment of the present invention includes the first to third spring parts 110, 120, and 130. The description of the first to third spring parts 110, 120, and 130 uses the description of the first embodiment.

The spring assembly 100a is connected to the supporter 60 and the rear cover 70 so as to elastically support the supporter 60 and the rear cover 70.

The description of the configuration of the supporter 60, that is, a supporter body 61, a supporter opening 62, a supporter groove 63, a piston fastening hole 66, and a supporter recessed portion 67 uses the description of the first embodiment. In addition, the first coupling member 65 can be fastened to the fixing bracket 300 through the supporter 60.

The description of the configuration of the rear cover 70, that is, a cover body 71, a cover opening 72, a spring hole 73, a leg hole 74, and a cover recessed portion 76 uses the description of the first embodiment. In addition, the second coupling member 75 may pass through the rear cover 70 and be fastened to the fixing bracket 300.

The spring assembly 100a includes fixing brackets 300 provided on both side portions of the three spring parts 110, 120, and 130.

The fixing bracket 300 includes a first fixing bracket 300a provided on the first side portion 100a of the three spring parts 110, 120, and 130 and coupled to the supporter 60 and a second fixing bracket 300b provided on the second side portion 100b of the three spring parts 110, 120, and 130 and coupled to the rear cover 70. The first and second fixing brackets 300a and 300b may have the same configuration.

In detail, the fixing bracket 300 includes a bracket main body 310 into which the spring parts 110, 120, and 130 are inserted, and body coupling portions 320 which are provided on both sides of the bracket main body 210 and are coupled to the supporter body 61 and the cover body 71. The body coupling portion 320 may be formed with a fastening hole 323 into which the first coupling member 65 or the second coupling member 75 described in the first embodiment is inserted.

The bracket main body 310 includes a support part 311 inserted into a supporter recessed portion 67 of the supporter 60 or a cover recessed portion 76 of the rear cover 70. The support part 311 may be located between the two body coupling portions 320.

The bracket main body 310 is formed with a spring insertion portion 313 into which one side portion of the spring parts 110, 120, and 130 is inserted. The spring insertion portion 313 includes a groove or a hole formed to be recessed from one surface of the bracket main body 310 in a radial direction.

The bracket main body 310 includes ribs 312a and 312b to which the bracket coupling member 330 is coupled. A plurality of ribs 312a and 312b are provided and the plurality of ribs 312a and 312b include a first rib 312a and a second rib 312b spaced from each other. The bracket coupling member 330 includes a screw or a rivet and may be fastened through the first and second ribs 312a and 312b arranged in the radial direction. In other words, the fastening direction of the bracket coupling member 330 may be a radial direction.

A portion of the spaced space between the first and second ribs 312a and 312b forms the spring insertion portion 313. After the spring parts 110, 120, and 130 are inserted into the spring insertion portion 313, the bracket coupling member 330 is fastened to the first and second ribs 312a and 312b and thus the bonding force to the spring parts 110, 120, and 130 can be increased. In other words, the bracket fastening member 330 can perform a fastener function with respect to the spring parts 110, 120, and 130.

The spring insertion portion 313 may be located between the support part 311 and the first and second ribs 312a and 312b. In other words, the bracket main body 310 is configured such that the support part 311, the spring insertion portion 313, and the first and second ribs 312a and 312b are disposed in order (axially aligned), and thus the bracket main body 310 can stably fix the spring parts 110, 120, and 130 to the supporter 60 and the rear cover 70.

Figure 11:
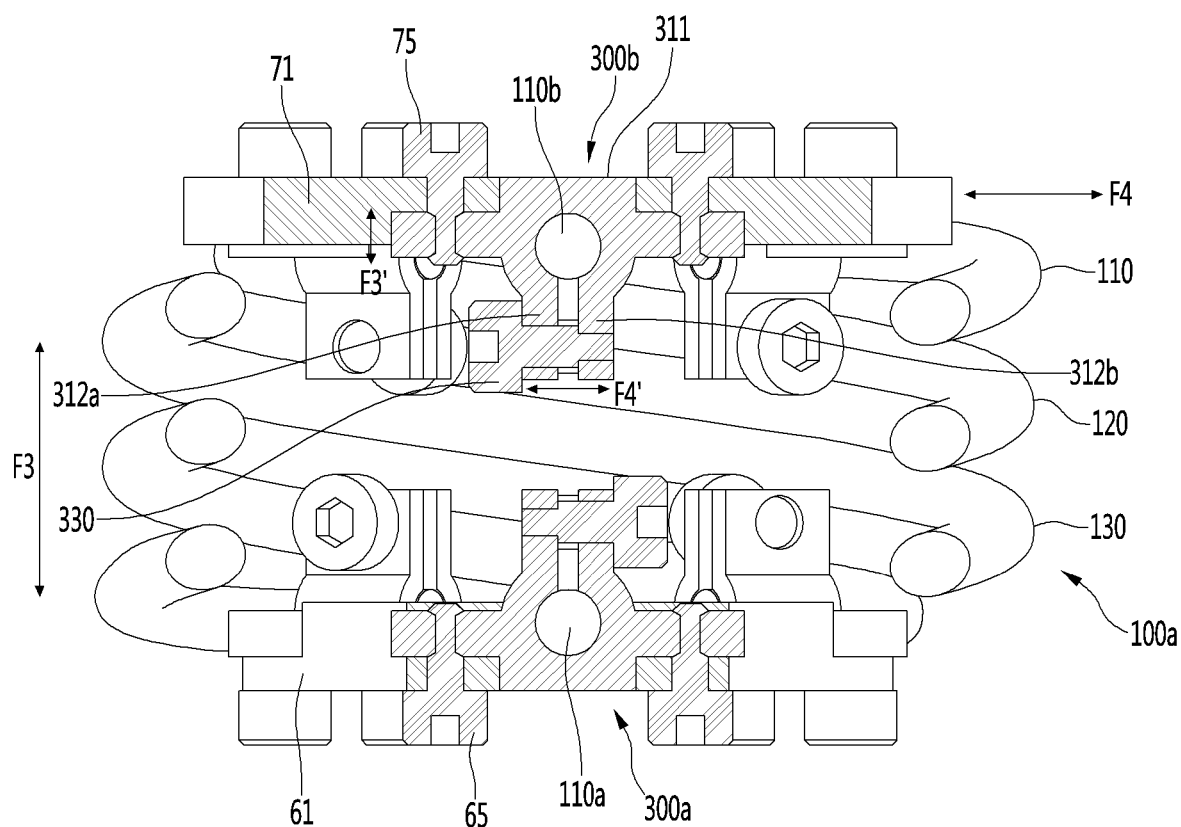
FIG. 11 is a sectional view taken along line 11-11' of FIG. 8.

FIG. 11 is a sectional view taken along line 11-11' of FIG. 8.

Referring to FIG. 11, the spring assembly 100a according to the second embodiment of the present invention is provided between the supporter 60 and the rear cover 70 and can elastically support the reciprocating movable portion P (see FIG. 1).

The spring assembly 100a includes first to third spring parts 110, 120, and 130 which are coupled to a plurality of points of the supporter 60 and the rear cover 70 and constitute one coil spring. For example, the plurality of points form three points, and the spring assembly 100 can support the supporter 60 and the rear cover 70 by three points by means of the first to third spring parts 110, 120, and 130. The three points may form a central angle of 120 degrees at equidistant intervals based on the center of the supporter 60 and the rear cover 70.

The first side portion 110a provided to each of the first to third spring parts 110, 120 and 130 can be inserted into the spring insertion portion 313 of the first fixing bracket 300a and the first fixing bracket 300a can be coupled to the supporter 60. In addition, the bracket fastening member 330 can be fastened to the two ribs 312a and 312b extending from the spring insertion portion 313 and thus the first fixing bracket 300a can be in close contact with the first side portion 110a.

The second side portion 110b of each of the first to third spring parts 110, 120, and 130 can be inserted into the second fixing bracket 300b and the second fixing bracket 300b can be coupled to the rear cover 70. The bracket fastening member 330 can be fastened to the two ribs 312a and 312b extending from the spring insertion portion 313 so that the first fixing bracket 300a can be in close contact with the first side portion 110a.

In a process of operating the linear compressor 10, a load F3 in the axial direction acts on the spring assembly 100, so that tensile or compressive deformation in the axial direction may occur. At this time, since the first and second fixing brackets 300a and 300b are in a state of being axially fixed to the supporter 60 and the rear cover 70 by the first and second coupling members 65 and 75, respectively, the load F3 may be canceled by the fixing force F3' of the first and second coupling members 65 and 75.

Meanwhile, in a process of operating the linear compressor 10, the spring assembly 100 may be deformed laterally by a load, that is, a lateral force F4 acting in the radial direction. At this time, since the bracket coupling member 330 radially inserted into the first and second fixing brackets 300a and 300b is in contact with the first and second side portions 110a and 110b to form a supporting force F4', it is possible to prevent the first and second side portions 110a and 110b from being radially deformed or damaged by the load F4.

What is claimed is:

1. A linear compressor comprising:
a shell;
a cylinder that is disposed in the shell and that extends in an axial direction including a frontward direction and a rearward direction, the cylinder defining a compression space therein configured to receive refrigerant;
a piston disposed in the cylinder and configured to reciprocate in the axial direction;
a supporter coupled to a rear end of the piston and configured to support the piston;
a rear cover spaced apart from the supporter in the rearward direction; and
a spring assembly disposed between the supporter and the rear cover in the axial direction,
wherein the spring assembly comprises:
a plurality of spring parts, each of the plurality of spring parts having a first side portion that supports the supporter and a second side portion that supports the rear cover, and
a fixing bracket that defines a spring insertion portion configured to receive the first side portion of one of the plurality of spring parts or the second side portion of one of the plurality of spring parts, the fixing bracket being coupled to the supporter or the rear cover, wherein the fixing bracket comprises:
a bracket main body that defines the spring insertion portion and an insertion hole,
a body coupling portion disposed at each of both sides of the bracket main body, and
a coupling member that fastens the body coupling portion to the supporter or the rear cover, and
wherein the linear compressor further comprises an insertion member that is configured to be inserted into the insertion hole and contact the first side portion or the second side portion of one of the plurality of spring parts.

2. The linear compressor of claim 1, wherein the fixing bracket is one of a plurality of fixing brackets comprising:
a first fixing bracket coupled to the supporter and configured to support the first side portion of a spring part among the plurality of spring parts; and
a second fixing bracket coupled to the rear cover and configured to support the second side portion of the spring part.

3. The linear compressor of claim 1, wherein the plurality of spring parts comprise:
a first spring part that supports a first point of the supporter and a first point of the rear cover;
a second spring part that supports a second point of the supporter and a second point of the rear cover; and
a third spring part that supports a third point of the supporter and a third point of the rear cover.

4. The linear compressor of claim 1, wherein the coupling member is one of a plurality of coupling members comprising:
a first coupling member that fastens the body coupling portion to the supporter; and
a second coupling member that fastens the body coupling portion to the rear cover.

5. The linear compressor of claim 1, wherein the insertion member is configured to be in direct contact with a circumferential surface of the first side portion or the second side portion of the one of the plurality of spring parts.

6. The linear compressor of claim 1, wherein the plurality of spring parts are disposed between a rear end of the supporter and a front end of the rear cover in the axial direction.

7. The linear compressor of claim 1, wherein the spring insertion portion extends in a direction that intersects the axial direction.

8. The linear compressor of claim 1, wherein the bracket main body comprises:
a first rib and a second rib that extend from the spring insertion portion and that are spaced apart from each other; and
a bracket coupling member that fastens the first rib and the second rib to each other.

9. The linear compressor of claim 8, wherein the supporter comprises a supporter main body having a plate shape and defines a supporter recessed portion that is recessed from an outer surface of the supporter main body, and
wherein the bracket main body further comprises a support part located in the supporter recessed portion.

10. The linear compressor of claim 9, wherein the support part, the spring insertion portion, the first rib, and the second rib are arranged along an axial direction of the bracket main body toward the supporter or the rear cover.

11. The linear compressor of claim 1, wherein the insertion hole comprises:
a first insertion hole that is recessed from an outer surface of the bracket main body in an axial direction of the bracket main body toward the supporter or the rear cover, the first insertion hole being in communication with the spring insertion portion.

12. The linear compressor of claim 11, wherein the first insertion hole is one of a plurality of first insertion holes that are in communication with the spring insertion portion.

13. The linear compressor of claim 11, wherein the insertion member comprises a first insertion member configured to be inserted into the first insertion hole, and
wherein the first insertion member extends in a normal direction orthogonal to one of the plurality of spring parts that is inserted into the spring insertion portion.

14. The linear compressor of claim 11, wherein the spring insertion portion is recessed from the outer surface of the bracket main body in a first direction that intersects with a second direction in which the first insertion hole is recessed from the outer surface of the bracket main body, the second direction corresponding to the axial direction of the bracket main body.

15. The linear compressor of claim 14, wherein the bracket main body further defines a second insertion hole that is recessed from the outer surface of the bracket main body in a radial direction of the bracket main body intersecting the axial direction, the second insertion hole being in communication with the spring insertion portion, and
wherein the second insertion hole extends from the outer surface of the bracket main body in a third direction that intersects with each of the first direction and the second direction, the third direction corresponding to the radial direction of the bracket main body.

16. The linear compressor of claim 15, further comprising a second insertion member configured to be inserted into the second insertion hole, and
wherein the second insertion member extends in a normal direction orthogonal to one of the plurality of spring parts that is inserted into the spring insertion portion.

17. A linear compressor comprising:
a shell;
a cylinder that is disposed in the shell and that extends in an axial direction including a frontward direction and a rearward direction, the cylinder defining a compression space therein configured to receive refrigerant;
a piston disposed in the cylinder and configured to reciprocate in the axial direction;
a supporter coupled to a rear end portion of the piston and configured to support the piston;
a rear cover spaced apart from the supporter in the rearward direction; and
a spring assembly disposed between the supporter and the rear cover in the axial direction,
wherein the spring assembly comprises:
a spring part including a first side portion that supports the supporter and a second side portion that supports the rear cover,
a first fixing bracket configured to support the first side portion of the spring part and coupled to the supporter, and
a second fixing bracket configured to support the second side portion of the spring part and coupled to the rear cover,
wherein at least one of the first fixing bracket or the second fixing bracket comprises:
a bracket main body that defines a spring insertion portion configured to receive the first side portion or the second side portion of the spring part,
a body coupling portion disposed at each of both sides of the bracket main body, and a first coupling member that fastens the body coupling portion of the first fixing bracket to the supporter, or a second coupling member that fastens the body coupling portion of the second fixing bracket to the rear cover, and wherein the bracket main body of the at least one of the first fixing bracket or the second fixing bracket further defines:

a first insertion hole that is recessed from an outer surface of the bracket main body in a first direction toward the supporter or the rear cover, the first insertion hole being in communication with the spring insertion portion, and a second insertion hole that is recessed from the outer surface of the bracket main body in a second direction intersecting the first direction, the second insertion hole being in communication with the spring insertion portion, wherein the second direction corresponds to an axial direction of the bracket main body.

18. The linear compressor of claim 17, wherein the spring part is one of a plurality of spring parts comprising:

a first spring part that supports a first point of the supporter and a first point of the rear cover;

a second spring part that supports a second point of the supporter and a second point of the rear cover; and a third spring part that supports a third point of the supporter and a third point of the rear cover.

19. The linear compressor of claim 17, further comprising:

a first insertion member configured to be inserted into the first insertion hole and contact the first side portion or the second side portion of the spring part; and a second insertion member configured to be inserted into the second insertion hole and contact the first side portion or the second side portion of the spring part.

* * * * *